United States Patent [19]

Nance et al.

[11] Patent Number: 5,979,829
[45] Date of Patent: Nov. 9, 1999

[54] IN-FLIGHT EVACUATION SYSTEM

[76] Inventors: Neil Wade Nance, 4817 Pinedale Dr., Forest Park, Ga. 30050; Cleveland Nance, 2118 Alton Ct., Fork, S.C. 29543

[21] Appl. No.: 08/804,071

[22] Filed: Feb. 21, 1997

[51] Int. Cl.$^6$ ............ B64D 25/02; B64D 25/08; B64D 1/12
[52] U.S. Cl. ............ 244/141; 244/138 R; 244/137.2
[58] Field of Search ............ 244/118.6, 138 R, 244/122 A, 137.1, 137.2, 137.3, 140, 141

[56] References Cited

U.S. PATENT DOCUMENTS

| | | | |
|---|---|---|---|
| 4,050,655 | 9/1977 | Bogue et al. | 244/137.3 |
| 5,039,162 | 8/1991 | Yoshida | 244/141 |
| 5,110,071 | 5/1992 | Hunter | 244/140 |

FOREIGN PATENT DOCUMENTS

| | | | |
|---|---|---|---|
| 2687124 | 8/1993 | France | 244/141 |
| 649327 | 11/1962 | Italy | 244/141 |
| 133299 | 5/1990 | Japan | 244/141 |
| 934312 | 8/1963 | United Kingdom | 244/141 |

*Primary Examiner*—V. Lissi Mojica

[57] ABSTRACT

A safety system that will evacuate passengers on an airplane while in flight. The In-Flight Evacuation System operates while the airplane is still in flight. While in operation the In-Flight Evacuation System will systematically evacuate passengers from the airplane. During the process the seats will rotate 180 degrees to face the rear of the plane. The seats will move towards the rear of the plane due to a rotating device connected along the bottom of the seats. When evacuation is deemed necessary, the rear doors on the plane will opened. The seats will continue to be rotated until it reaches the evacuation doors. At that point the seats will disengage. The top portion of the seat complete with a survival kit will be released with the passengers as the bottom of the seat rotates into a open compartment beneath the passenger cabin. A parachute will be activated as the passengers leave the rear of the plane. The passengers will slowly ascend to earth. After landing, the survival kit will be used until rescuers arrive.

7 Claims, 4 Drawing Sheets

Ground

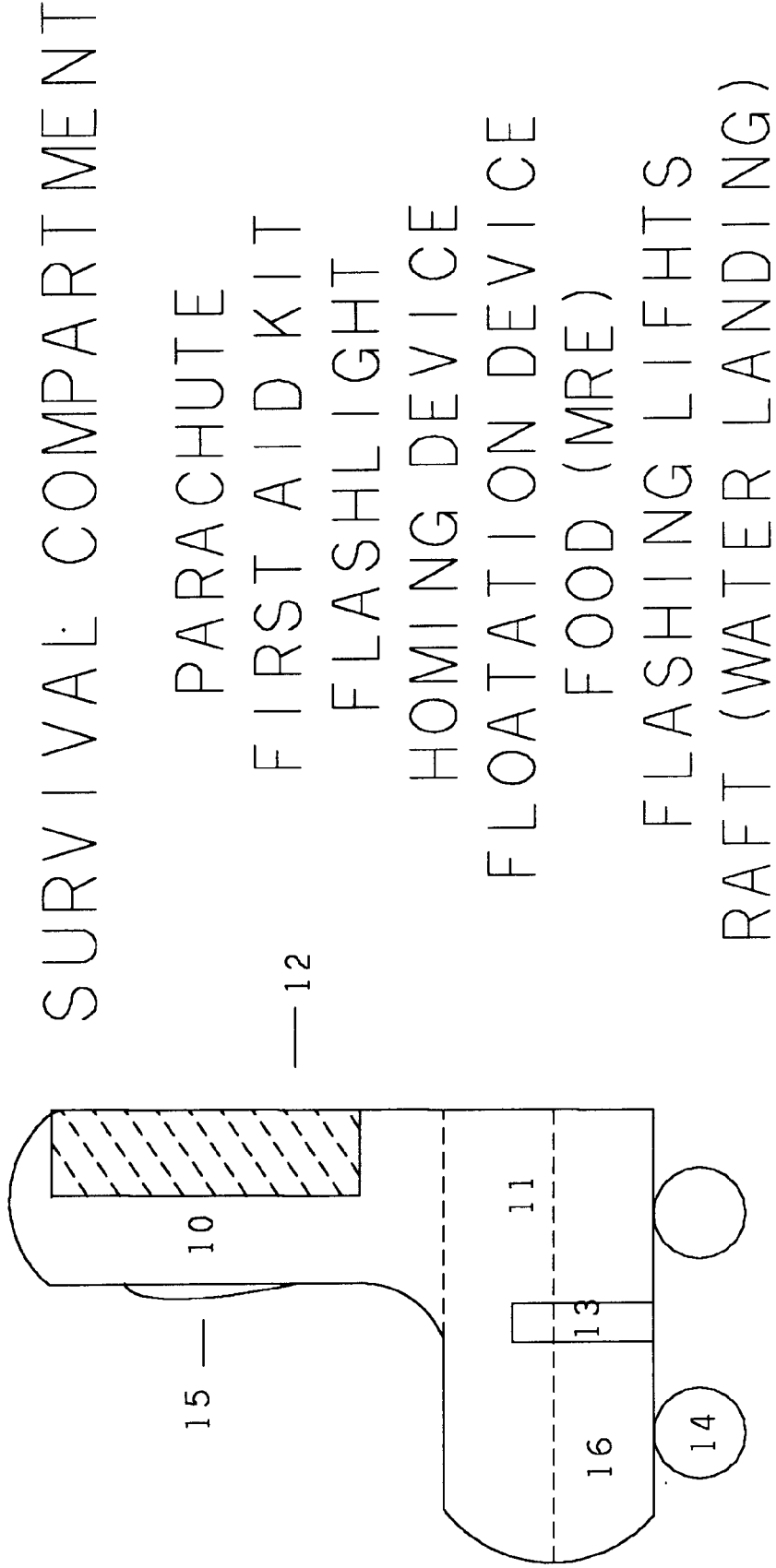

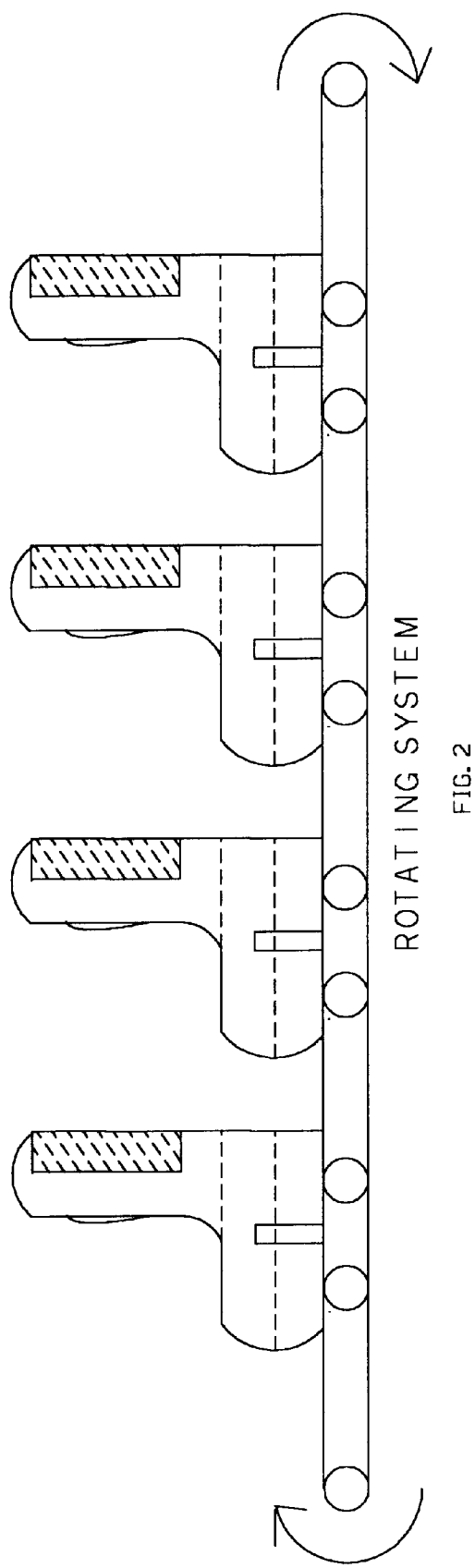

IN-FLIGHT EVACUATION SYSTEM

CROSS-REFERENCE TO RELATED APPLICATION

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a life saving evacuation system for passenger airplanes while in flight.

One of today's greatest airline concerns is airplane safety. This concern is due to a high number of airplane crashes in the recent past. Although these crashes have many different causes, the result usually ends in loss of life. Due to the major effect that these crashes have of the general public, the public's safety and well being has become more important as each crash occurs.

BRIEF SUMMARY OF THE INVENTION

The object of the In-Flight Evacuation System is to save the lives of passengers and crews on airplanes. The industry has been under scrutiny for its lack of solutions for the problems that result in crashes. This system will regain the trust of the people in the air transportation industry.

The In-Flight Evacuation System includes seats that can be rotated 180 degrees. It will have a systematic system of rotating the seats to the rear of the plane. There will be a sliding door at the rear of the plane, in which evacuation will be enabled. Levers, switches, and hooks will be activated along the process of releasing the passengers and crews out of the troubled airplane.

BRIEF DESCRIPTION OF THE DRAWINGS

FIG. 1 is a side view of the seat to be used in the airplanes. The compartment for all the survival equipment can be seen from this view.

FIG. 2 is a side view of the aligned seats. It shows the system needed to rotate the seats to the rear of the plane.

DETAILED DESCRIPTION OF THE INVENTION

Referring to FIG. 1, an airplane passenger seat will have several different functions. The first function of the passenger seat in the evacuation system is to rotate the passenger 180 degrees. This rotation will be possible due to a rotating rod (#13) placed in the top (#11) and bottom (#16) sitting portion of the passenger seat. The rotation of the seats will occur as soon as the pilot or crew member initiates the system. After the rotation, one size fits all helmets will be released from a compartment from above for each passenger seat. With helmet in place and the rotation to face the rear of the plane complete, the wheels (#14) connected to the bottom of the passenger seat will begin to roll, due to the rotating system as shown in FIG. 2. This rotating system will rotate at a constant rate to allow for a smooth trip to the rear of the plane and a timed ejection from the plane.

Figure 4:
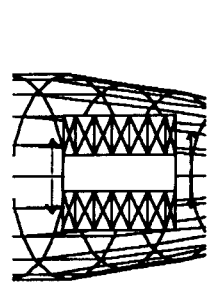
FIG. 4 is a exloped bottom view of the plane. This view also shows how the door will slide open before evacuation.
Figure 3:
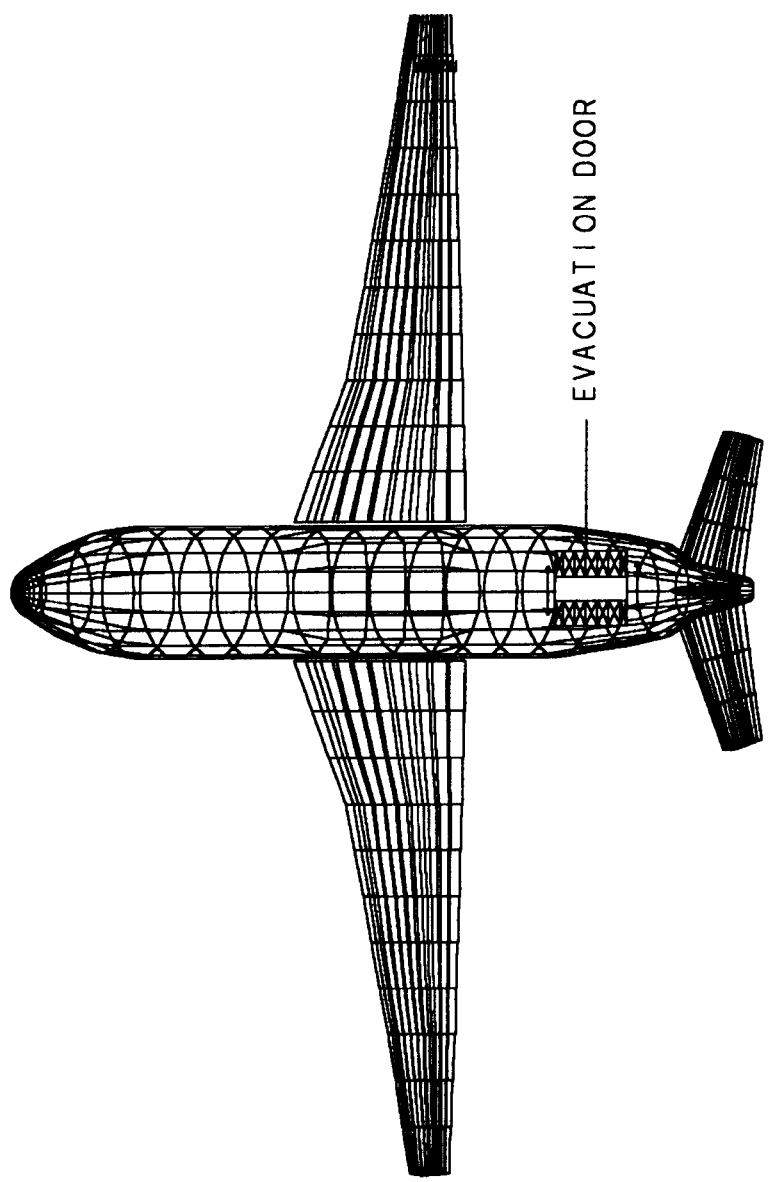
FIG. 3 is a bottom view of the plane. This view shows how the door will slide open before evacuation.

Referring to FIG. 3, the sliding doors near the bottom rear of the airplane will open allowing for a place of evacuation for the passengers. As shown in a larger scale in FIG. 4, the doors will slide in opposite directions; one left and one right. The opening of the doors will begin as soon as the pilot or other crew member initiates the system.

Figure 5:
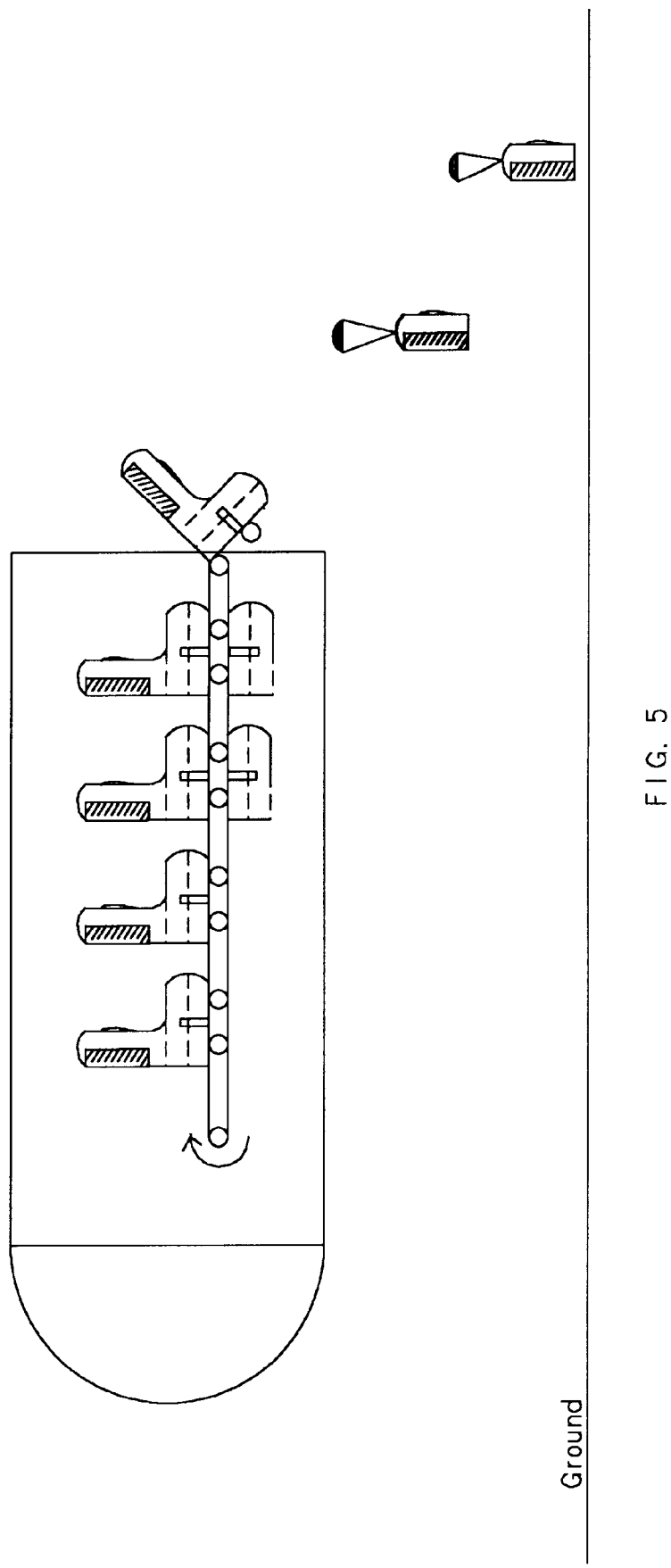
FIG. 5 is a side view of the evacuation. This view shows the release of the passengers from the plane, the disengagement of the seat, and the parachutes safely descending the passengers.

Referring to FIG. 5 the evacuation of the airplane can be visualized. As the seats reach the ejection point the passenger seat in FIG. 1 will disengage between the top sitting portion (#11) and the back support (#10). As the back support (#10) is ejected a parachute will be automatically released from the survival compartment (#12). The top (#11) and bottom (#16) sitting portion of the seat will rotate underneath into an open compartment beneath the system. The passengers descends to earth slowly and safely with back support portion (#10) of the passenger seat attached to the back by over the shoulder back straps (#15). While in descending to earth, the back support will be emitting a light source due to flashing lights. After landing, on land or water, the survival kit will be used to keep the passengers and crew alive and well. The homing devices will alert all rescuers to the proper location of passengers.

The In-Flight Evacuation System will be an automatic functioning system. The system will be timed to ensure the minimum amount of time needed to evacuate all passengers and crew from the airplane. The system will have two sources of power; one being supplied by the electrical system of the plane and the other being a backup battery powered system. A battery powered system will be used in case of loss of power by the airplane.

We claim:

1. An in-flight evacuation system including:

an aircraft having a rear exit portion and a passenger seat floor;

an emergency door at the rear of said aircraft;

an aircraft passenger seat;

a seat rotating means;

said aircraft passenger seat having a back support portion and a sitting portion, said back portion including survival compartment means, wherein the back support portion disengages from the sitting portion during the evacuation of passengers;

the seat rotating means rotates the seat 180 degrees upon initiation of the evacuation system;

a passenger seat rotating system wherein the seat rotating system carries the seat portion of the seat along a carrier that is positioned along the top of the passenger seat floor and below the aircraft passenger seat floor;

wherein said rotating system carries the seat and passenger to the exit door, where the back and support portion of the seat disengage, and upon disengagement, the passenger exits the vehicle and the support portion of the seat continues to travel along the passenger seat rotating system.

2. The evacuation system of claim 1 wherein the survival compartment includes a parachute.

3. The evacuation system of claim 1 wherein the survival compartment includes a first aid kit.

4. The evacuation system of claim 1 wherein the back support portion includes safety straps for the passenger.

5. The evacuation system of claim 1 including an auxiliary power source for the evacuation system.

6. The evacuation system of claim 1 wherein the back support portion includes safety lights.

7. The evacuation system of claim 1 wherein the back support portion is a floatation device.

* * * * *